United States Patent Office 3,331,829
Patented July 18, 1967

3,331,829
DISAZO DYESTUFFS INSOLUBLE IN WATER
Marcel Georges Jirou, Sotteville-les-Rouen, and Jean Marie Louis Leroy, Rouen, France, assignors to Etablissements Kuhlmann, Paris, France
No Drawing. Filed Nov. 19, 1963, Ser. No. 324,853
Claims priority, application France, Nov. 21, 1962, 916,148
1 Claim. (Cl. 260—152)

The present invention concerns new water-insoluble disazo dyestuffs and their application to the coloration of hydrophobic fibres.

It relates particularly to dyestuffs, free from water-solubilising groups of the formula:

$$A\!-\!N\!=\!N\!-\!B\!-\!N\!=\!N\!-\!W \qquad (I)$$

in which A represents a benzene residue, B represents a benzene or naphthalene residue and W represents the group of the formula:

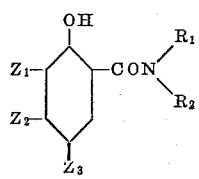

(II)

in which one Z represents a hydrogen atom or a $CH_3$ group and the others represent hydrogen atoms, $R_1$ and $R_2$ each represent hydrogen atoms, alkyl groups of low molecular weight (perferably having less than 5 carbon atoms), hydroxyalkyl groups of low molecular weight, acetyl or cyclohexyl or $R_1$ and $R_2$ may form part of a saturated heterocyclic group such as a morpholino or piperidino ring.

The dyestuffs of Formula I may be prepared by coupling amides of Formula II derived from salicyclic or cresotic acids with diazo derivatives of the monoazo dyestuffs of the formula:

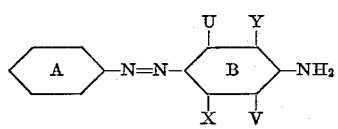

(III)

in which U and X represent hydrogen or chlorine atoms or $-CH_3$, $-C_2H_5$, $-OCH_3$, $-OC_2H_5$, $-NHCOCH_3$ or $-OCH_2CH_2OH$ groups, V and Y represent hydrogen atoms or $-CH_3$, $-C_2H_5$, $-OCH_3$, $-OC_2H_5$ or $-OCH_2CH_2OH$ groups, X and V however being able to form part of a naphthalene ring system instead of corresponding with the above definitions, and the benzene ring A may be substituted by $-CH_3$, $-C_2H_5$, $-OCH_3$, $-OC_2H_5$, $-OCH_2CH_2OH$, $-NHCOCH_3$, or $-NO_2$ groups or chlorine atoms.

The amino-monoazo dyestuffs corresponding to the Formula III may be obtained by coupling the diazo derivative of a benzene amine $A\!-\!NH_2$ with an amine $B\!-\!NH_2$, capable of coupling in the para position, of the aniline or alpha-naphthylamine series and their substituted derivatives.

The disazo compounds of Formula I are excellent dyestuffs. Sparingly soluble in water, they are taken up from aqueous dispersions on to hydrophobic fibres, such as synthetic polyamide fibres like "Nylon" and "Rilsan" fibres based on cellulose esters, for example the acetate, diacetate or triacetate of cellulose, and fibres based on polyesters, notably ethylene glycol polyterephthalate.

Shades ranging from orange to brown are obtained, which have excellent fastness to light, sublimation, washing and perspiration.

The great interest of the invention lies in the fact that homogeneous browns are thus obtained. Up to the present most brown shades have been obtained by mixing several elements. If the components have not exactly the same curves for going on to the fibre and the same saturation values with regard to the fibres, a different shade results according to their use. The invention enables this disadvantage to be avoided.

The following examples illustrate the present invention without limiting it. The parts indicated are by weight unless the contrary is stated.

*Example 1*

19.7 parts of 4-amino-azobenzene are mixed with 40 parts by volume of 19° Bé. hydrochloric acid, made up to a volume of 700 parts and diazotised at 80° C. by the addition of 13.8 parts by volume of a 50% solution of sodium nitrite. The solution of the diazo derivative is slowly introduced into a solution of 15.2 parts of the amide of p-cresotic acid in 500 parts by volume of an alkaline solution prepared by means of 6.5 parts by volume of 35° Bé. caustic soda and 30 parts of sodium carbonate. The coupling medium is filtered, and the dyestuff collected is mixed with dispersing agents such as dinaphthylmethane sulphonates, dried and ground. On dyeing fibres based on polyesters either by means of vehicles at a temperature below 100° C. or without vehicles at a temperature above 120° C., a yellow-brown shade is obtained which has excellent fastness to wet tests, light and sublimation.

*Example 2*

9.3 parts of aniline are diazotised in the usual way. The diazotisation bath is introduced into an acid solution of 12.3 parts of m-anisidine while reducing the acidity of the mixture by the addition of sodium acetate. When coupling is finished, the reaction mixture is filtered. The monoazo compound obtained is then rediazotised like the 4-amino-azobenzene in Example 1 and coupled with 15.2 parts of the amide of o-cresotic acid in alkaline medium. The coupling medium is filtered; the dyestuff obtained is mixed with dispersing agents such as dinaphthylmethane sulphonates, dried and ground. When applied on polyester fibres according to the usual dyeing methods, with or without a vehicle, it gives a full-bodied brown orange possessing excellent fastness to wet tests, sublimation and light.

The following table gives examples of dyestuffs conforming to Formula I.

| Example No. | Substituents of A | Substituents of B | | | | Substituents of W | | | | |
|---|---|---|---|---|---|---|---|---|---|---|
| | | X | V | Y | U | $Z_1$ | $Z_2$ | $Z_3$ | $R_1$ | $R_2$ |
| 3 | | $CH_3$ | H | H | $CH_3$ | H | H | H | H | $CH_2CH_2OH$ |
| 4 | 2'-methyl | H | H | $CH_3$ | H | H | H | H | H | $C_4H_9$ |
| 5 | | $OCH_3$ | H | H | H | H | H | H | $C_2H_5$ | $C_2H_5$ |
| 6 | 4'-ethoxy | $OCH_3$ | H | H | $OCH_3$ | H | H | H | H | $NHCOCH_3$ |
| 7 | 4'-methoxy | $OCH_3$ | H | H | H | H | H | H | H | H |
| 8 | 4'-nitro | $CH_3$ | H | H | H | H | H | H | Cyclohexyl | H |
| 9 | 3'-methoxy | Cl | H | H | H | H | H | H | Morpholino | |
| 10 | | $NHCOCH_3$ | H | H | H | H | H | H | H | H |
| 11 | | H | H | $CH_3$ | H | $CH_3$ | $CH_3$ | H | $CH_3$ | H |
| 12 | 2'-methyl | $OCH_3$ | H | H | H | $CH_3$ | $CH_3$ | H | H | $C_4H_9$ |
| 13 | | $OCH_3$ | H | H | H | $CH_3$ | $CH_3$ | H | H | $CH_3$ |
| 14 | 4'-hydroxyethoxy | $OCH_3$ | H | H | $OCH_3$ | $CH_3$ | $CH_3$ | H | H | H |
| 15 | 4'-methoxy | $OCH_3$ | H | H | H | $CH_3$ | $CH_3$ | H | H | H |
| 16 | 4'-nitro | H | H | H | H | $CH_3$ | $CH_3$ | H | H | H |
| 17 | 2'-chloro | $OCH_3$ | H | H | H | $CH_3$ | $CH_3$ | H | H | $C_3H_7$ |
| 18 | 4'-acetylamino | $OCH_3$ | H | H | H | $CH_3$ | $CH_3$ | H | H | $CH_3$ |
| 19 | | H | H | H | H | H | H | $CH_3$ | H | $CH_3$ |
| 20 | 2'-ethyl | H | H | $C_2H_5$ | H | H | H | $CH_3$ | H | $CH_3$ |
| 21 | do | $OCH_3$ | H | H | H | H | H | $CH_3$ | $CH_3$ | $CH_3$ |
| 22 | 4'-methoxy | $OCH_3$ | H | H | H | H | H | $CH_3$ | H | H |
| 23 | do | $OCH_3$ | H | $OCH_3$ | H | H | H | $CH_3$ | H | H |
| 24 | | H | H | $OCH_3$ | H | H | H | $CH_3$ | Piperidino | |
| 25 | | HC(B)=CH–CH=CH | | H | H | H | H | $CH_3$ | H | H |
| 26 | | HC(B)=CH–CH=CH | | $OCH_3$ | H | H | H | $CH_3$ | H | H |
| 27 | 4'-methoxy | $OCH_3$ | H | H | H | H | $CH_3$ | H | H | H |
| 28 | | H | H | H | H | H | $CH_3$ | H | $C_2H_5$ | $C_2H_5$ |
| 29 | 2'-methyl | H | H | $CH_3$ | H | H | $CH_3$ | H | H | $C_2H_5$ |
| 30 | 3'-nitro | $OCH_3$ | H | H | H | H | $CH_3$ | H | H | $C_2H_5$ |
| 31 | | H | $OCH_3$ | $OCH_3$ | H | H | $CH_3$ | H | H | H |
| 32 | 3'-chloro | $OCH_2CH_2OH$ | H | H | H | H | $CH_3$ | H | H | $CH_3$ |

On fibres based on polyesters the dyestuffs of Examples 22 to 26 inclusive give brown shades, those of Examples 19 to 21 inclusive and 27 to 32 inclusive give yellow-brown shades, those of Examples 6, 7 and 15 give orange-brown shades, those of Examples 3 to 5 inclusive and 8, 10 and 18 give brownish orange shades, the dyestuff of Example 11 gives an orange-yellow shade, those of Examples 12 to 14 inclusive and 17 give yellow orange shades, that of Example 9 give an orange shade and that of Example 16 gives a brown-orange shade.

*Example 33*

A printing paste is prepared which is composed of the following elements:

| | Parts |
|---|---|
| Dyestuff of Example 19 | 6 |
| Sodium methylene dinaphthylsulphonate | 14 |
| Monoethyl ether of ethylene glycol | 50 |
| Water | 300 |
| Aqueous solution of sodium chlorate containing 300 g. per litre | 30 |
| Starch tragacanth | 600 |

This paste is applied on a grooved roller on a fabric of polyester fibres previously desized in the hot by alkaline washing. The colour is fixed by steaming under pressure at 130–140° C. The fabric is rinsed and treated in the hot with an alkaline reducing bath containing 1 to 2 g. per litre of an octylphenol/ethylene oxide condensate. The fabric is coloured a yellow brown shade having excellent fastness, the reserved parts being perfectly white.

*Example 34*

A foularding bath composed of the following elements is prepared:

| | Parts |
|---|---|
| Dyestuff of Example 33 | 30 |
| Sodium methylene dinaphthylsulphonate | 7 |
| Starch tragacanth | 5 |
| Quantity of water sufficient for | 100 |

A strip of polyester fabric is foularded several times in this dispersion and heat-fixed for 1 minute at 200° C.

Since the dyestuff is very fast to sublimation, it remains on the fibre and does not migrate on to the cold parts of the apparatus.

We claim:
Disazo dyestuffs of the formula:

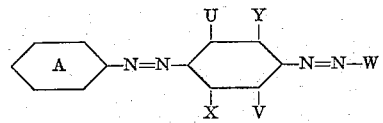

wherein the benzene nucleus A may be substituted by at least one member selected from the group consisting of chlorine and the methyl, ethyl, methoxy, ethoxy, hydroxyethoxy, acetylamino and nitro groups, U and X each represent a member selected from the group consisting of hydrogen and chlorine and the methyl, ethyl, methoxy, ethoxy, acetylamino and hydroxyethoxy groups, V and Y each represent a member selected from the group consisting of hydrogen and the methyl, ethyl, methoxy, ethoxy and hydroxyethoxy group, X and V taken together represent the —CH=CH—CH=CH— radical and W represents the residue of a coupling compound of the formula:

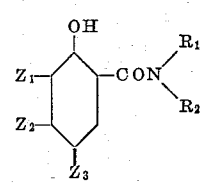

in which one Z represents a member selected from the group consisting of hydrogen and the methyl group, and the other two represent hydrogen atoms, $R_1$ and $R_2$ represent a member selected from the group consisting of hydrogen, alkyl groups having up to four carbon atoms, hydroxy-alkyl groups having up to four carbon atoms and the acetyl group, $R_2$ represents a cyclohexyl group if $R_1$ represents a hydrogen atom, $R_1$ and $R_2$ together with the nitrogen atom form a heterocyclic ring selected from the group consisting of morpholine and piperidine rings.

References Cited

UNITED STATES PATENTS 3,071,571   1/1963   Gross et al. _____ 260—187

CHARLES B. PARKER, *Primary Examiner.*

D. M. PAPUGA, *Examiner.*